Figure 1:
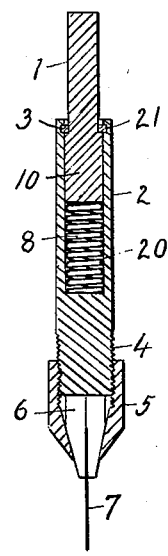

Nov. 16, 1943.  F. J. VANN  2,334,363
BORING TOOL
Filed June 15, 1942

INVENTOR
Frank J. Vann
By
ATTORNEY

Patented Nov. 16, 1943

2,334,363

UNITED STATES PATENT OFFICE 2,334,363

BORING TOOL

Frank J. Vann, Montreal, Quebec, Canada

Application June 15, 1942, Serial No. 447,087

2 Claims. (Cl. 64—30)

This invention relates to boring tools and particularly to a device in which small drills are employed.

The object of the invention is to provide a mounting of the drill chuck which holds the drill, on the drive spindle which rotates the drill in which a frictional device is inserted between the chuck spindle and the drive spindle. By this means if the torque of the drive spindle overcomes the friction which couples it to the drill chuck, the drive spindle becomes free to rotate without driving the drill chuck. The invention in its normal operation provides that a cushioned pressure and uniform cutting feed is maintained by the drill on the work being operated.

A further object is to prevent breakage of the drill and the delay and loss of time in the removal and replacement of broken drills.

In modern mechanism a great deal of the work of drilling is carried out by multiple drills operating simultaneously and in present day mass production methods, the time element is of vital importance.

Actual experience with the invention has proved its efficiency and value in preventing breakage and loss of time, as well as efficient operation.

The invention consists briefly in providing a spring connection between the drive spindle and the chuck spindle.

In the detailed description to follow reference will be made to the accompanying drawing in which the single figure shows a vertical section of the device.

The device comprises a chuck spindle 2 provided with a chuck of any well known type such as the jaws 6 and the chuck body 5 on the threads 4, on the spindle 2, adapted to close the jaws 6 and grip the drill 7.

The upper portion of the chuck spindle 2 is bored to form a chamber 20 to contain a small spring 8 and the enlarged lower end 10 of the drive spindle 1.

In the upper end of the bore 20 a groove 21 is cut to hold a locking ring 3 to retain the lower end 10 of the drive spindle 1, in the chamber 20.

In assembling the device the spring 8 is inserted in the chamber 20 and the lower end 10 of the drive spindle 1 is pressed down on and to compress the spring 8 until the locking ring 3 can be inserted in the groove 21 above the shoulder formed by the enlarged lower end 10 of the drive spindle 1.

The operation of the device is as follows:

The small drill to be employed is inserted in the jaws of the chuck which is secured tight on the chuck spindle. The drive spindle is mounted in the drill press.

The drill is then brought into contact with the work to be drilled at the desired spot and lowered slightly by the drill lever to compress the spring in the chamber, and to provide the required feed pressure when the drill lever is locked. By this means the only pressure on the small drill is the pressure of the spring in the chuck spindle and the rotational drive by the drive spindle on the chuck and drill is due to the friction created by the compressed spring.

In the case of the drill jamming this friction is overcome and the drive spindle is free to rotate. The release of the chuck and drill will thereby prevent injury or breakage.

Besides this function the device provides a cushioned pressure to the drill as well as a uniform feed pressure provided by the spring.

By means of this device one operator can run a number of drills at the same time without special attention and only occasional varying of the feed if necessary.

By means of this boring tool, the operator can adjust and lock the levers of a number of drive spindles of small drills and leave them, knowing that they will feed correctly and that the drills will be safe from fracture.

What I claim is:

1. In a boring tool the combination of a drive spindle, a drill chuck having a spindle bored to provide a chamber to receive the drive spindle with a spring inserted in the chamber below the end of the drive spindle, adapted to provide an axial coupling.

2. In a boring tool, the combination of a drive spindle, a drill chuck having a spindle bored to provide a chamber to receive the lower end of the drive spindle, means to retain it therein, with a coil spring inserted in the chamber between the end of the drive spindle and the bottom of the chamber, adapted to provide an axial coupling.

FRANK J. VANN.